Figure 1:
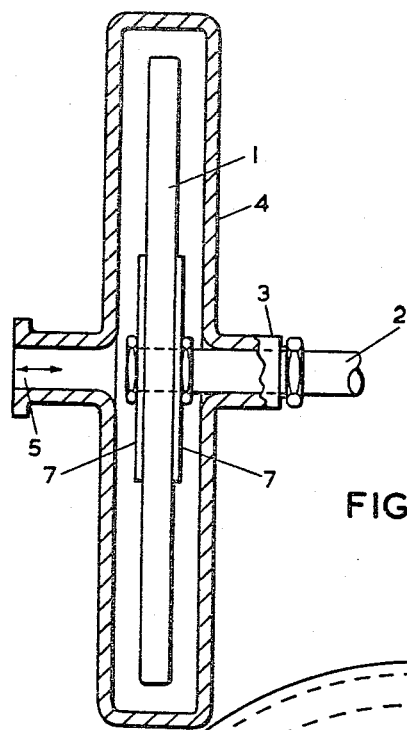

July 18, 1967     J. HODGSON ET AL     3,331,560

PROCESS FOR MILLING OF PARTICULATE SOLIDS IN LIQUIDS

Filed July 17, 1964     2 Sheets-Sheet 1

INVENTORS
John Hodgson
Robert Oswald Hall
BY Irons, Birch, Swindler & McKie
ATTORNEYS July 18, 1967  J. HODGSON ET AL  3,331,560
PROCESS FOR MILLING OF PARTICULATE SOLIDS IN LIQUIDS
Filed July 17, 1964  2 Sheets-Sheet 2

INVENTOR
John Hodgson
Robert Oswald Hall
BY Irons, Birch, Swindler, & McKie
ATTORNEYS

United States Patent Office 3,331,560
Patented July 18, 1967

3,331,560
PROCESS FOR MILLING OF PARTICULATE SOLIDS IN LIQUIDS
John Hodgson and Robert Oswald Hall, Burnie, Tasmania, Australia, assignors to British Titan Products Company Limited, Billingham, England, a company of the United Kingdom
Filed July 17, 1964, Ser. No. 383,427
Claims priority, application Great Britain, July 29, 1963, 29,097/63
14 Claims. (Cl. 241—16)

The present invention relates to an improved process for the milling of particulate solids in liquids. Since milling processes can also be used for the dispersion of particulate solids in liquids without appreciable reduction in the size of the particles, the term "milling" is used in this specification to include both the reduction in size of the solid particles and the dispersion of solid particles in liquids.

Previously used apparatus and process for the milling of particulate solids in liquids have been described, for example in British specifications 679,552, 810,005, 900,050 and also in U.S. Patent 3,185,398 and British Patent 1,024,053. The apparatus and processes described in these specifications generally comprise an open-ended vertical container into which projects a rotatable shaft carrying a number of circular impellers of larger diameter than the shaft.

The particulate solid to be milled, a liquid, and generally a milling medium such as particles of silica, glass ballotini, zircon, alumina or titanium dioxide, are placed in the container and the mixture is agitated by rotating the impellers immersed in the mixture at high speed.

Such processes have been found to suffer from several disadvantages. For example, the power consumption required to mill the particulate solid, for example titanium dioxide particles, is very high and the apparatus is therefore unnecessarily large and the process is excessively expensive to operate. Furthermore, the high power input and prolonged residence time in the container of the solid to be milled leads to heating of the contents of the container and it is difficult to remove this heat quickly, particularly when the apparatus is made, or lined with, a material which has poor heat conducting properties, for example polyurethane rubber, as described and claimed in our British specification 900,050.

Another difficulty is experienced in such processes when a milling medium of small particle size is used, for example a zircon sand of particle size in the range of about 50 microns to 150 microns. When such a milling medium is used the slurry in the mill tends to expand in volume and under these conditions the distances between the solid milling medium particles increase and the efficiency of milling decreases.

Again, abrasion of the container and/or impellers in the previously used processes has been troublesome owing to the large areas exposed to the milling action, particularly when the surfaces are not coated with, or made from, a material which resists abrasion such as polyurethane rubber. In the milling of pigments, for example titanium dioxide pigments, the abrasion of metal surfaces leads to contamination of the pigment with metal particles and to a consequent loss of brightness of the pigment.

It is an object of the present invention to provide a process and apparatus wherein some or all of the above disadvantages are reduced or eliminated.

Accordingly, the present invention is a process comprising introducing a slurry of particulate solid and a liquid into a vessel containing a single rotatable impeller and withdrawing from the vessel a slurry of milled solid wherein the particulate solid is introduced into, or withdrawn from, the vessel through orifices, one of which directs the flow of slurry substantially at right angles to the plane of the impeller and the other directs the flow of slurry either substantially in the plane of, or at right angles to, the plane of the impeller.

The invention is also an apparatus comprising a vessel containing a single rotatable impeller and inlet and outlet orifices one of which is formed substantially at right angles to the plane of the impeller and the other is formed substantially at right angles to, or in the plane of, the impeller.

The vessel containing the impeller is preferably liquid tight with the exception of the orifices and is normally made of metal although it may be made from, or lined with, another material which is resistant to abrasion, for example polyurethane rubber.

The impeller is normally fixed to a rotatable shaft which passes through a wall of the vessel by means of a gland which prevents leakage of liquid through the wall of the vessel at this point. The shaft may be driven by any suitable means, for example by an electric motor.

The impeller is preferably a disc of suitable material, for example made of, or coated with, a polymer such as polyurethane rubber, polypropylene or polyethylene, or a metal, for example titanium, providing the metal is one which does not undergo excessive abrasion and thereby contaminate the material being milled. This is particularly important where pigments such as titanium dioxide are being milled, the properties of which may be adversely affected by such contamination.

The impeller should be rotated at a sufficiently high speed to provide the necessary milling of the particulate solid. The optimum speed at which the impeller is rotated may vary depending, among other things, upon the nature of the solid to be milled and upon the conditions under which the mill is operating, for example in the presence or absence of a second particulate solid to act as a milling medium. In the milling of titanium dioxide in the presence of a milling medium such as Ottawa or zircon sand, peripheral speeds for the impeller in the range of about 10 to 120 feet per second have been found satisfactory, particularly speeds in the range 20 to 105 feet per second.

The optimum speed of rotation of the impeller for the milling of a particulate solid under the desired conditions can readily be determined by trial and error.

Similarly, the distance between the surfaces of the impeller and the surrounding vessel should be such as to ensure an adequate milling of the particulate solid and the optimum value will depend to some extent upon the nature of the material to be milled, the size of the mill and upon the conditions under which the mill is operated. When milling titanium dioxide pigment in a vessel having an impeller eleven inches in diameter in the presence of a milling medium such as Ottawa or zircon sand, a distance between the impeller and the interior wall of the casing in the range of about 0.25 to 6 inches has been found satisfactory, particularly a distance in the range 0.5 to 3 inches and more particularly a distance in the range of about 0.5 to 1 inch.

If desired, the periphery of the impeller and/or the interior of the side wall of the vessel may be serrated in order to give enhanced milling of the particulate solid.

By the term "plane of the impeller" is meant an imaginary plane falling along the diameters, and passing through the centre of, the impeller.

The orifice or orifices which direct the flow of slurry in a direction at right angles to the plane of the impeller are formed in the side walls of the vessel and one is conveniently formed in the centre of the side wall opposite that through which the driving shaft passes. Such a port is conveniently the exit port through which the slurry containing the milled pigment (and milling medium, if used) is withdrawn from the mill. Where both orifices direct the slurry in a direction at right angles to the plane of the impellers the other orifices is normally in the wall of the vessel through which the shaft carrying the impeller passes and this is conveniently the inlet orifice through which slurry containing unmilled pigment is introduced into the mill.

Where an orifice directs the flow of the slurry in the plane of the impeller this is in the side wall of the vessel (i.e., the wall between that through which the shaft carrying the impeller passes and the opposite wall) and preferably directs the slurry substantially tangentially to the periphery of the impeller. Such an orifice, where present, is preferably the inlet orifice through which the solid to be milled and liquid (together with milling medium, if used) are introduced into the mill.

Where such an orifice is present it is preferred that the impeller is rotated in the same direction as that in which the slurry is directed by such an orifice.

It is preferred to introduce solid to be milled, liquid and particulate milling medium (when used) together as a slurry into the mill.

After the slurry of milled solid, milling medium (if used) and liquid has been withdrawn from the mill, the milling medium can be separated from the slurry by any suitable means, for example by settling, sieving or by the use of a centrifuge and the milled solid may be recovered, for example by filtration, and subjected to any additional process desired such as coating and/or fluid energy milling. Alternatively, the slurry may be passed through one or more additional mills of the type described in the present specification before being recovered and subjected to additional treatments. It may be advantageous to alter the concentration of solid in the additional mills by introducing a diluting liquid, for example water, between the mills, if desired.

Alternatively or additionally, chemicals may be added to the slurry passing between the mills to vary the characteristics of the slurry, for example dispersing agents or, if desired, a flocculating agent.

Cooling may also be applied to the slurry passing between mills, if desired, and this is particularly advantageous if heat transfer from the mill itself is inhibited, for example by the presence of a coating of polyurethane rubber within the mill casing.

It has been found that milling of the particulate solid is very substantially improved if holes are formed between the faces of the impeller. A number of holes, for example at least 4 and particularly at least 6, are preferably provided evenly spaced around the impeller. The size and position of the holes between the centre and the periphery will depend upon the size of the impeller but the holes should not be so formed as to mechanically weaken the impeller. Holes having a diameter in the range of about ¼ inch to 1 inch and evenly spaced on a line between the centre and the periphery of the impeller have been found to be particularly suitable.

It has also been found advantageous to form the holes at an angle to the faces of the impellers, for example at an angle between 30° and 60° and particularly at an angle of 45°. The direction of the angle of the holes is preferably such that when the impeller is rotated the slurry being milled tends to be thrown towards that wall of the vessel containing the outlet orifice.

When milling titanium dioxide pigment it has been found convenient to supply a slurry to the mill containing titanium dioxide to be milled at a concentration in the range of about 250 to 2000 grams per litre, particularly a concentration in the range of about 600 to 1200 grams per litre.

The slurry fed to the mill preferably contains a dispersing agent, for example an inorganic compound such as an alkali metal, e.g., sodium silicate, hydroxide, metaphosphate and/or polyphosphate or an organic material, for example an organic amine, particularly an alkanolamine such as an ethanolamine or propanolamine, particularly monoisopropanolamine. Other dispersing agents may be used which do not have an adverse effect upon the milling or upon the solids to be milled. A mixture of sodium silicate and monoisopropanolamine has been found particularly effective.

The dispersing agent, when used, is preferably present in the slurry when milling titanium dioxide in an amount between about 0.05% and 2.5%, particularly an amount in the range 0.2% to 1.5%, by weight on the titanium dioxide.

When titanium dioxide is being milled which has been produced by the "sulphate" process the material, after discharge from the calciner, is preferably leached, for example with water or dilute acid, before being milled by the process of the present invention.

The mills of the present invention are normally fed with slurry under a positive pressure and preferably at a substantially constant rate, for example by means of a pump.

The retention time in the mill of the solids to be milled will depend upon the feed rate of the slurry to the mill and upon the dimensions of the mill, particularly upon the volume between the impeller and the containing vessel. Retention times in the range 10 to 50 seconds and particularly in the range 20 to 40 have been found very convenient when milling titanium dioxide pigment.

The mills of the present invention have a number of advantages compared with previously used mills. For example, they may be used satisfactorily with milling medium of a wider range of particle size for example between about 25 microns to 3000, particularly between about 75 to 1000 microns since changes in the rheology of the contents do not affect the milling efficiencies to the same extent as in other sand mills; they have a relatively low power consumption; the shorter residence time of the material to be milled in the mill reduces the rate of temperature increase and therefore the problem of cooling. Furthermore, the mills are relatively small and cheap to manufacture and, if desired, the material to be milled can be passed through a number of such mills in succession before recovering the milled solid. In such cases cooling and/or dilution of the slurry can take place between the mills if this is found desirable.

Figure 2:
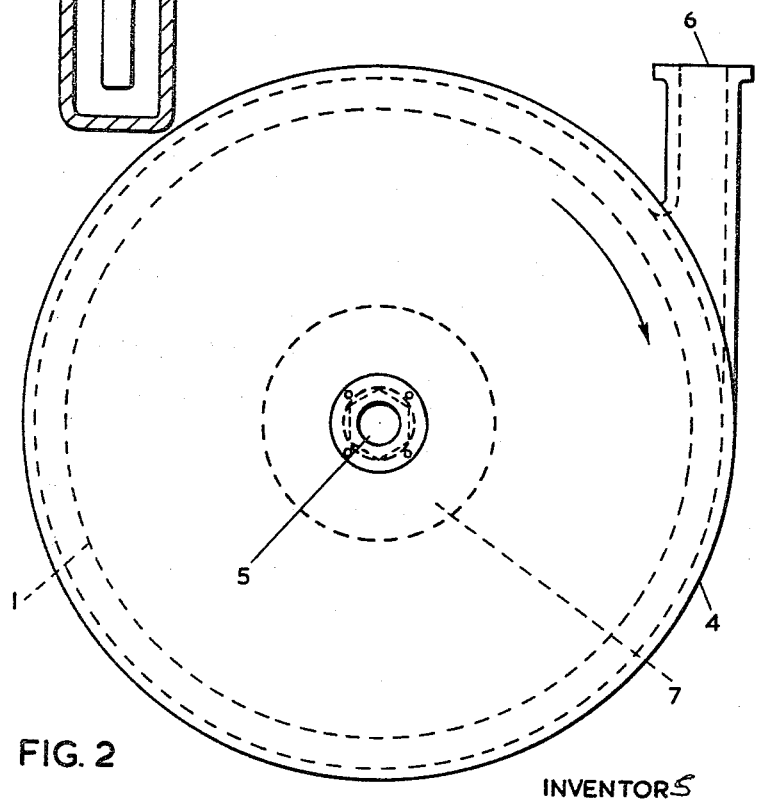

FIGURE 1 of the drawings accompanying the present specification shows an end view of the mill according to the present invention and FIGURE 2 shows a side view of such a mill having an orifice at right angles to the plane of the impeller and one in the plane of the impeller.

Figure 3:
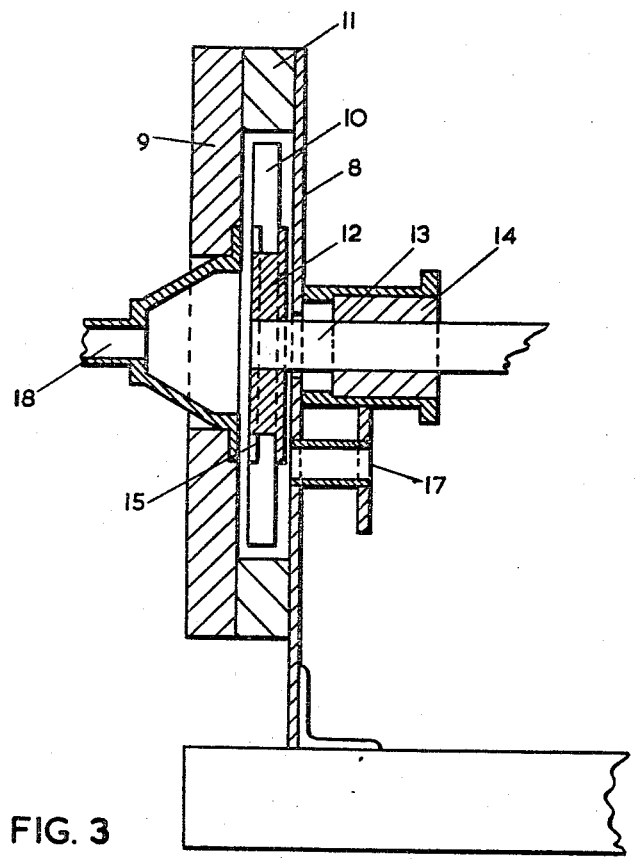
Figure 4:
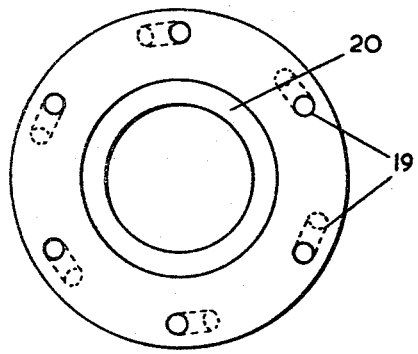

FIGURE 3 shows an embodiment of the invention having both orifices at right angles to the plane of the impeller and FIGURE 4 shows an impeller with holes between the faces.

In FIGURE 1, an impeller 1 is attached to a rotatable shaft 2 which passes through a gland 3 in the vessel wall 4. The shaft is adapted to be driven by an electric motor (not shown). An orifice 5 is provided through which the solid to be milled (preferably with liquid and milling medium) may be introduced or withdrawn at right angles to the impeller.

In FIGURE 2, an orifice 6 is provided through which solid to be milled may be withdrawn or introduced in the plane of the impeller. This orifice is so formed as to direct the flow of solid tangentially to the periphery of the impeller which is rotated in the direction shown by the arrow. Washers 7 are provided on each side of the impeller for mechanical support.

In FIGURE 3, wall 8 of the vessel is made of ⅜″ thick mild steel plate, the lower portion of which forms a projection whereby the mill may be bolted to a suitable support. Wall 9 of the mill is made from polyurethane rubber and is 1½″ thick. The impeller 10 is also made from polyurethane rubber and is ¾″ thick and 11¼″ diameter. The peripheral wall 11 consists of a polyurethane rubber ring 17½″ outside diameter, 12¾″ internal diameter and 2¼″ thick. Eight bolts (not shown) pass through the walls and peripheral ring.

The temperatures of the slurry introduced into, and withdrawn from, the mill were noted. The rise in temperature was only about 2 to 3½° C. per pass.

The power consumption appeared to vary between about 1.5 and 2 B.H.P.

TABLE 1

| Test | TiO₂ in slurry, g.p.l. | Disc speed, r.p.m. | Pumping rate, litres/ min. | Tinting strength after pass | | | | | | | | | Residence time (1 pass), seconds |
|---|---|---|---|---|---|---|---|---|---|---|---|---|---|
| | | | | 0 | 1 | 2 | 3 | 4 | 5 | 6 | 7 | 8 | |
| 1 | 600 | 975 | 10.0 | 1,590 | 1,730 | 1,750 | 1,790 | | | | | | 19.5 |
| 2 | 1,160 | 975 | 7.6 | 1,570 | 1,670 | 1,730 | 1,740 | 1,760 | 1,760 | | | | 25.7 |
| 3 | 850 | 975 | 10.0 | 1,570 | 1,710 | 1,750 | 1,770 | 1,770 | 1,780 | | | | 19.5 |
| 4 | 838 | 1,325 | 9.0 | 1,670 | 1,740 | 1,750 | 1,770 | 1,780 | | | | | 21.7 |
| 5 | 915 | 975 | 6.8 | 1,660 | 1,740 | 1,760 | 1,770 | 1,770 | | | | | 28.7 |
| 6 | 847 | 1,325 | 6.0 | 1,670 | 1,740 | 1,760 | 1,760 | 1,770 | 1,780 | 1,790 | 1,810 | 1,820 | 32.5 |
| 7 | 1,015 | 1,325 | 4.4 | 1,690 | 1,730 | 1,750 | 1,770 | 1,780 | 1,810 | | | | 44.3 |
| 8 | 600 | 1,325 | 12.0 | 1,680 | 1,760 | 1,780 | 1,800 | 1,820 | 1,850 | | | | 16.3 |
| 9 | 863 | 1,325 | 12.0 | 1,660 | 1,740 | 1,750 | 1,770 | 1,780 | 1,800 | | | | 16.3 |
| 10 | 1,060 | 1,325 | 9.0 | 1,660 | 1,730 | 1,750 | 1,760 | 1,770 | 1,780 | | | | 21.7 |
| 11 | 620 | 1,325 | 8.0 | 1,680 | 1,740 | 1,750 | 1,770 | 1,780 | 1,800 | | | | 24.4 |
| 12* | 907 | 1,500 | 3.8 | 1,650 | 1,680 | 1,700 | 1,700 | | | | | | 46.5 |
| 13* | 250 | 1,500 | 6.0 | 1,640 | 1,690 | 1,710 | 1,720 | 1,730 | | | | | 32.5 |
| 14* | 400 | 1,500 | 6.0 | 1,600 | 1,650 | 1,640 | 1,630 | | | | | | 32.5 |
| 15* | 308 | 1,500 | 7.0 | 1,670 | 1,680 | 1,700 | 1,710 | 1,740 | | | | | 27.9 |
| 16* | 1,265 | 1,500 | 7.2 | 1,590 | 1,610 | 1,630 | 1,670 | 1,670 | | | | | 27.2 |
| 17 | 850 | 1,325 | 7.0 | 1,670 | 1,750 | 1,760 | 1,780 | 1,790 | 1,810 | | | | 27.9 |

*No milling medium present.

The impeller is supported on a carrier 12 which is keyed to a shaft 13 passing through gland 14. Plate 15 is placed on the opposite face of the impeller to the carrier flange 16 and eight countersunk bolts (not shown) pass through the plate, impeller and carrier flange.

An inlet orifice 17 and central outlet orifice 18 are provided in the walls of the mill and the dimensions of the impeller and interior of the mill walls are such that an overall clearance of ¾″ exists between these.

FIGURE 4 shows the six holes 19 of ½″ diameter which are drilled through the impeller at an angle of 45° to the faces of the impeller. A recess 20 is provided for the plate 15. The holes are evenly spaced on a circle of 9¾″ diameter.

*Example 1*

A mill similar to that described in FIGURES 1 and 2 containing an impeller eleven inches in diameter and one half inch thick in a vessel of such dimensions that a space of one half inch was left between the vessel and the surface of the impeller was set up. The vessel was made of zinc-free bronze.

The rotatable shaft was driven by a 5 H.P. electric motor through a variable gear providing speeds in the range 490 to 1900 r.p.m.

Slurries of varying concentrations of calciner discharge titanium dioxide which had been roughly mechanically milled were made up in the presence of various dispersing agents and these were fed to the orifices in the plane of the impeller at the rate shown in Table 1. In some cases a volume of sand equal to that of the slurry was added to the slurry before feeding the latter to the mill. The tinting strength of the pigment in the slurry withdrawn from the orifice at right angles to the impeller was tested (by the Reynolds Blue method) and the slurry was recycled through the mill at least three times as shown in Table 1.

In tests 1 to 11, zircon sand (having a majority of particles in the range 85 to 130 microns) was added to the slurry before milling.

In test 17, Ottawa sand (particle size range 500 microns to 1000 microns) was added to the slurry before milling.

1% sodium silicate was added as a dispersing agent in tests 1 to 8, 12, 13 and 15 and 1% sodium hexametaphosphate was added as a dispersing agent in tests 9 to 11 and 16. In test 16, sodium hydroxide was also added in sufficient quantity to produce a pH value of about 9 in the slurry. No dispersing agent was present in test 14.

*Example 2*

An aqueous slurry was made up containing about 1100 g./litre of titanium dioxide (consisting of roughly premilled calciner discharge) 1% sodium silicate and sufficient zircon sand to give a sand/slurry ratio of 1:1, and was passed once through the mill described in FIGURES 3 and 4 at the feed rates and disc speeds shown below. The gain in tinting strength (on the Reynold's Blue scale) was measured and is shown in Table 2.

TABLE 2

| Feed Rate (litres/min). | Disc Speed (r.p.m.) | Gain in Tinting Strength (points on Reynold's Blue Scale) |
|---|---|---|
| 1.37 | 820 | 180 |
| 1.38 | 1,900 | 240 |
| 1.53 | 1,900 | 230 |
| 2.03 | 1,230 | 180 |
| 4.56 | 1,900 | 160 |
| 5.38 | 1,900 | 150 |

*Example 3*

The mill was then compared with a similar mill in which the holed impeller was replaced by a plain impeller (without holes) of similar size under the conditions of feed rate and disc speed shown. The slurry passed through the mill was similar in constitution to that previously described but 1.3% by weight sodium hexametaphosphate was used as dispersing agent in place of sodium silicate as dispersing agent. The results are given in Table 3.

TABLE 3

| Feed Rate (litres/min.) | Disc Speed (r.p.m.) | Type of Disc— Plain, Holed | Gain in Tinting Strength (points) |
|---|---|---|---|
| 1.38 | 1,900 | Plain | 90 |
| 1.38 | 1,900 | Holed | 180 |
| 2.03 | 1,230 | Plain | 80 |
| 2.03 | 1,230 | Holed | 150 |
| 4.56 | 1,900 | Plain | 70 |
| 4.56 | 1,900 | Holed | 130 |
| 5.38 | 1,900 | Plain | 60 |
| 5.38 | 1,900 | Holed | 130 |
| 5.93 | 820 | Plain | 40 |
| 5.93 | 820 | Holed | 80 |

What is claimed is:
1. A process for milling particulate solids in liquids comprising the steps of

(a) providing a milling zone having, in operable association therewith, the following elements:
   (i) a single rotatable impeller within said milling zone,
   (ii) a first fluid-directing means for directing the flow of fluid between the inside and outside of said milling zone in a direction substantially at right angles to the plane of element (i), and
   (iii) a second fluid-directing means for directing the flow of fluid between the inside and outside of said milling zone in a direction substantially at right angles to one of said elements (i) and (ii),
(b) rotating said element (i) with a peripheral speed in the range of about 10 to 120 feet per second,
(c) introducing through one of said fluid-directing means into said milling zone a slurry containing particulate solids to be milled at a concentration in the range of about 250 to 2000 grams per liter of slurry,
(d) maintaining said slurry in said milling zone for a period corresponding to a retention time of 10 to 50 seconds per pass, and
(e) withdrawing said slurry from said milling zone through the other of said fluid-directing means.

2. A process as claimed in claim 1 wherein the slurry also contains a particulate milling medium having a particle size in the range of 25 to 3000 microns.

3. A process as claimed in claim 2 wherein the particulate milling medium has a particle size in the range 75 to 1000 microns.

4. A process as claimed in claim 1 wherein the impeller is rotating at a peripheral speed in the range 20 to 105 feet/second.

5. A process as claimed in claim 1 wherein the slurry introduced into the milling zone contains an amount of particulate solids to be milled in the range 600 to 1200 g./litre.

6. A process as claimed in claim 1 wherein the particulate solid to be milled is titanium dioxide.

7. A process as claimed in claim 1 wherein the slurry introduced into the milling zone contains a dispering agent selected from the group consisting of an alkali metal silicate, phosphate, alkanolamine and alkylamine.

8. A process as claimed in claim 7 wherein the dispersing agent is present in a concentration in the range 0.05% to 2.5% by weight on the particulate solids to be milled.

9. A process in accordance with claim 1 wherein said second fluid-directing means is in the plane of the impeller and wherein the slurry in step (c) is introduced through said second fluid-directing means tangential to said impeller.

10. A process in accordance with claim 9 wherein said slurry is directed by said fluid-directing means in the direction of rotation of the impeller at the point of tangency.

11. A process for milling particulate solids in liquids comprising the steps of
(a) providing a milling zone having in operable association therewith the following elements:
   (i) a single rotatable impeller within said milling zone,
   (ii) a first fluid-directing means for directing the flow of fluid between the inside and outside of said milling zone in a direction substantially at right angles to the plane of element (i), and
   (iii) a second fluid-directing means lying in the plane of impeller (i) for directing the flow of fluid between the inside and outside of said milling zone in a direction substantially at right angles to said first fluid direction means (ii) and tangential to impeller (i),
(b) introducing a slurry containing particulate solids to be milled at a concentration in the range of about 250 to 2000 grams per liter of slurry through said second fluid-directing means (iii) into said milling zone tangential to said impeller (i) and in the same direction as the direction of rotation of said impeller (i) at the point of tangency.
(c) maintaining said slurry in said milling zone for a period corresponding to a retention time of 10 to 50 seconds per pass, and
(d) withdrawing said slurry from said milling zone through said first fluid-directing means.

12. A process in accordance with claim 11 wherein the slurry introduced into the milling zone also contains a particulate milling medium having a particle size in the range of 25 to 3000 microns.

13. A process in accordance with claim 1 wherein said fluid-directing means (ii) and (iii) are both perpendicular to impeller (i) and closely spaced relative thereto but on opposite sides thereof and wherein fluid directed into said milling zone through one of said fluid-directing means impinges said impeller (i) perpendicular to the plane of said impeller.

14. A process in accordance with claim 13 wherein said impeller (i) is a disc provided with passage passing therethrough at an angle of 30° to 60° with the plane of said impeller which permits a portion of the fluid directed into said milling zone which impinges said impeller to pass therethrough.

References Cited
UNITED STATES PATENTS

| | | | |
|---|---|---|---|
| 2,204,057 | 6/1940 | Swartz | 241—296 X |
| 2,255,105 | 9/1941 | Dixon | 241—296 X |
| 2,537,570 | 1/1951 | Bossert | 241—296 |
| 2,816,114 | 12/1957 | Ehrich | 241—16 |
| 3,049,307 | 8/1962 | Dalzell | 241—296 X |
| 3,118,622 | 1/1964 | Jones | 241—245 X |
| 3,176,925 | 4/1965 | Huband et al. | 241—21 X |
| 3,208,679 | 9/1965 | Wallen | 241—296 X |
| 3,229,917 | 1/1966 | Miller et al. | 241—16 |

FOREIGN PATENTS

| | | |
|---|---|---|
| 438,247 | 12/1926 | Germany. |
| 39,569 | 10/1915 | Sweden. |

ANDREW R. JUHASZ, *Primary Examiner.*